(12) United States Patent
Nathani et al.

(10) Patent No.: US 12,506,590 B2
(45) Date of Patent: Dec. 23, 2025

(54) METHODS FOR TRUSTED PLATFORM MODULE BASED SECURE DEVICE ENROLLMENT IN CLOUD SERVICES FOR MANAGED DEVICES

(71) Applicant: Cisco Technology, Inc., San Jose, CA (US)

(72) Inventors: Bhoomika Nathani, Ajmer (IN); Tarak Ranjan Mukherjee, Banaglore (IN); Arindam Gupta, Bangalore (IN); Shiladitya Dey, Kolkata (IN)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 18/404,562

(22) Filed: Jan. 4, 2024

(65) Prior Publication Data
US 2025/0226969 A1    Jul. 10, 2025

(51) Int. Cl.
   *H04L 9/06*        (2006.01)
   *H04L 9/08*        (2006.01)
   *H04L 9/32*        (2006.01)

(52) U.S. Cl.
   CPC .......... *H04L 9/0618* (2013.01); *H04L 9/0825* (2013.01); *H04L 9/321* (2013.01)

(58) Field of Classification Search
   CPC ... H04L 9/3263; H04L 9/0825; H04L 9/0877; H04L 9/3268; H04L 9/0897
   See application file for complete search history.

(56) References Cited

U.S. PATENT DOCUMENTS

| | | | | |
|---|---|---|---|---|
| 8,176,336 | B1* | 5/2012 | Mao | G06F 9/45558 |
| | | | | 713/189 |
| 10,735,190 | B1* | 8/2020 | Khare | H04L 9/0877 |
| 2005/0166051 | A1* | 7/2005 | Buer | H04L 9/3263 |
| | | | | 713/173 |
| 2006/0242428 | A1* | 10/2006 | Tarkkala | H04L 9/0897 |
| | | | | 713/189 |
| 2007/0003064 | A1* | 1/2007 | Wiseman | H04L 9/0836 |
| | | | | 380/281 |
| 2011/0093693 | A1* | 4/2011 | Ibrahim | G06F 21/86 |
| | | | | 713/189 |
| 2011/0099367 | A1 | 4/2011 | Thom et al. | |
| 2011/0099625 | A1* | 4/2011 | Thom | G06F 21/34 |
| | | | | 726/18 |
| 2020/0067915 | A1 | 2/2020 | Kumar et al. | |
| 2021/0243030 | A1* | 8/2021 | Robison | H04L 9/0877 |
| 2021/0392111 | A1 | 12/2021 | Sole et al. | |
| 2022/0182374 | A1 | 6/2022 | Peddada et al. | |
| 2023/0062888 | A1 | 3/2023 | Colombano | |

\* cited by examiner

*Primary Examiner* — Hany S. Gadalla
(74) *Attorney, Agent, or Firm* — Polsinelli P.C.

(57) ABSTRACT

A method for secure enrollment of a device in a cloud service includes establishing trust between a trusted platform module (TPM) of a device and a cloud service by bypassing a plain text exposure of an endorsement key (EK) of the TPM. The method also includes establishing secure communication between a cloud service agent of the device and the cloud service by using mutual Transport Layer Security (mTLS) to present a device certificate from the cloud service agent to the cloud service.

20 Claims, 14 Drawing Sheets

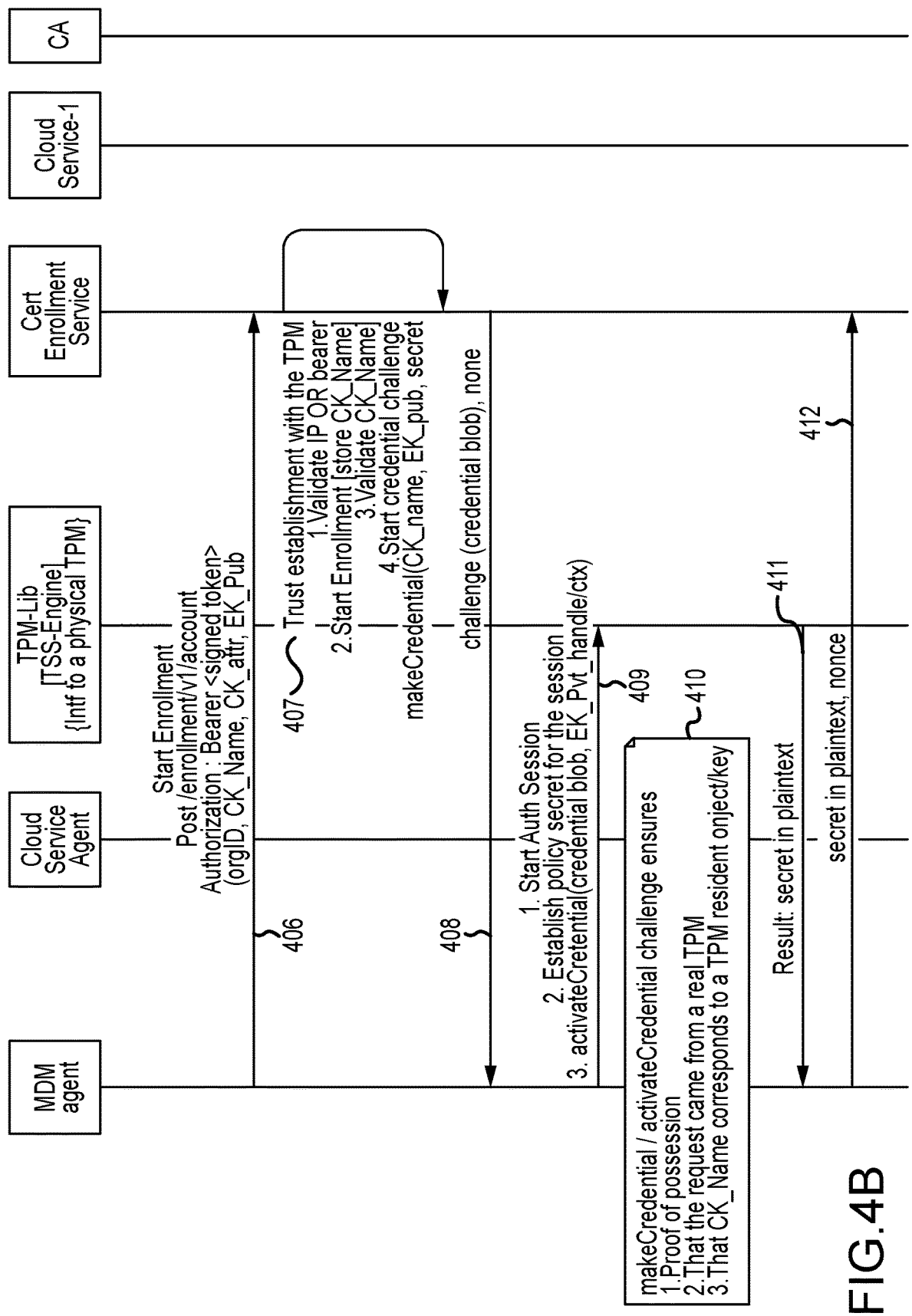

METHODS FOR TRUSTED PLATFORM MODULE BASED SECURE DEVICE ENROLLMENT IN CLOUD SERVICES FOR MANAGED DEVICES

TECHNICAL FIELD

The present disclosure relates to designing systems and methods that deliver secure device enrollment and establish trust between managed devices and cloud services. The secure device enrollment is Trusted Platform Module (TPM) based.

BACKGROUND

Trust is an important factor for successful online communication. Trust has been used as a criterion for service selection. Most trust and reputation studies assume a system where trust and reputations exist. Trust bootstrapping is an initial step in trust building process. Trust bootstrapping assists requestors in their service selection decision, which is important for reliable interaction with services and/or service providers that are new to the system.

TPM is a hardware-based crypto processor and is a hardware module that provides, through a trusted computing group (TCG) specification, root of trust for storage (RTS), root of trust for reporting (RTR), measured boot, and remote attestation and identity, among others. TPM directly provides RTS and RTR in a TPM based attestation. RTS is a trusted component that provides confidentiality and integrity protection. The RTS keeps the keys protected and tamper proof, prevents data-loss and flag data corruption, imposes access restriction, and guarantees that personal identification information (PII) is isolated. RTR is a trusted component that provides reports of any integrity measurements that may have been made-attesting to the platform configuration. For example, RTR detects when the critical data are corrupted.

Managed devices are typically company-owned devices that are usually set up and configured by a security team of an employer. Managed devices are different from unmanaged devices, which are also referred to as bring-your-own devices, and tend to be personally owned devices that employees set up and use.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4B illustrates a first continuation of the sequence diagram of FIG. 4A in accordance with some aspects of the present technology;

DESCRIPTION OF EXAMPLE EMBODIMENTS

Figure 1:
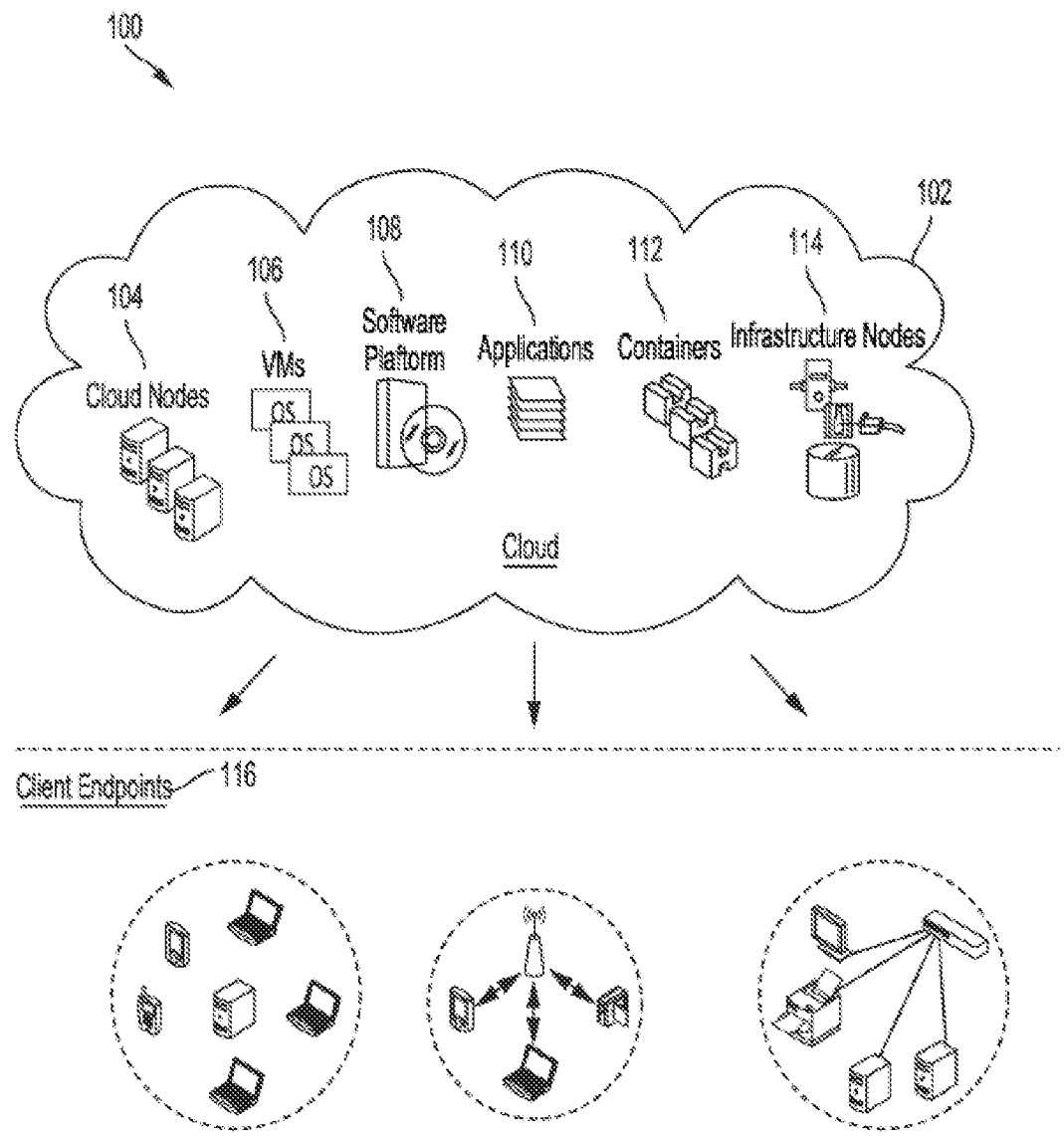
FIG. 1 illustrates an example cloud computing structure in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology establishes hardware Root of Trust by Trusted Platform Module (TPM) in compliance with ISO/IEC 11889-1:2015. The Root of Trust is Tamper evident. The Root of Trust includes Root of Trust for Storage (RTS) using keys and objects, Root of Trust of Measurement (RTM) using booting sequence and software state, and Root of Trust of Reporting (RTR) or Attestation using signed "quote" plus event log. It is safe to root trust in a hardware-based crypto module.

The present technology generates, stores, and uses cryptographic keys on the devices without plain text loading of private keys in memory. The present technology creates keys in an owner hierarchy and establishes trust between a device and a cloud service by proving that the device belongs to a trusted tenant, then proving that the device has a real hardware TPM, then proving that the key(s) to be enrolled are TPM resident or non-migratable, then proving that the device is in good state or remote attestation.

In one aspect, a method for secure enrollment of a device in a cloud service includes establishing trust between a trusted platform module (TPM) of a device and a cloud service by bypassing a plain text exposure of an endorsement key (EK) of the TPM. The method also includes establishing secure communication between a cloud service agent of the device and the cloud service by using mutual Transport Layer Security (mTLS) to present a device certificate from the cloud service agent to the cloud service.

In another aspect, a non-transitory computer-readable storage medium including instructions that when executed by a computer, cause the computer to establish trust between a trusted platform module (TPM) of a device and a cloud service by bypassing a plain text exposure of an endorsement key (EK) of the TPM. The non-transitory computer-readable storage medium including instructions that when executed by a computer, cause the computer to establish secure communication between a cloud service agent of the device and the cloud service by using mutual Transport Layer Security (mTLS) to present a device certificate from the cloud service agent to the cloud service.

In a further aspect, a computing apparatus includes a processor. The computing apparatus also includes a memory storing instructions that, when executed by the processor, configure the apparatus to establish trust between a trusted platform module (TPM) of a device and a cloud service by bypassing a plain text exposure of an endorsement key (EK) of the TPM. The computing apparatus also includes a memory storing instructions that, when executed by the processor, configure the apparatus to establish secure communication between a cloud service agent of the device and the cloud service by using mutual Transport Layer Security (mTLS) to present a device certificate from the cloud service agent to the cloud service.

EXAMPLE EMBODIMENTS

Currently, devices protected by domain name system (DNS) security, such as Umbrella DNS security, do not have a secure enrollment process. Cryptographic operations normally require a private key to be loaded in a plain text form. Cryptographic operations would leverage a TPM module, which is a standard interface to TPM, to perform cryptographic operations without letting clients directly access the private key.

TPMs are typically manufactured with a cryptographic identity assigned by the manufacturer without any awareness of which environment or domain for device enrollment. Therefore, a multi-tenant cloud service cannot establish a trust relationship with manufacturer generated endorsement keys (EKs) or attestation keys (AKs) from the same hierarchy.

The present technology addresses the need of designing systems and methods that deliver secure device enrollment and establish trust between devices and cloud services. The present technology provides methods of using Trusted Platform Module (TPM) to provide an added layer of security. Thus, the secure device enrollment is TPM based.

The present technology also uses mobile device management (MDM) agent for managed devices in conjunction with a certificate enrollment service for cloud services. The present technology provides initial trust bootstrapping via the MDM agent (e.g., enterprise MDM agent) for managed devices. All cryptographic operations are performed via the TPM module. After the device enrollment with cloud services, all communications with the cloud services would require mutual Transport Layer Security (mTLS). There are no direct access to private keys.

The present technology does not use a manufacturer generated EK for signing operations. The EK creates a unique signature, and can be traced back to a specific attester platform, which results in exposure of privacy of attesters. Also, the EK is capable of decrypting, but is not capable of signing. Since the EK is derived from a permanent seed and therefore EK cannot be changed. Hence, a signature capable key or an attestation key (AK) is used for attestation. The attestation provides assurance that the properties of the device (for example, a serial number of the device) are legitimate and verified by servers.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

Figure 2A:
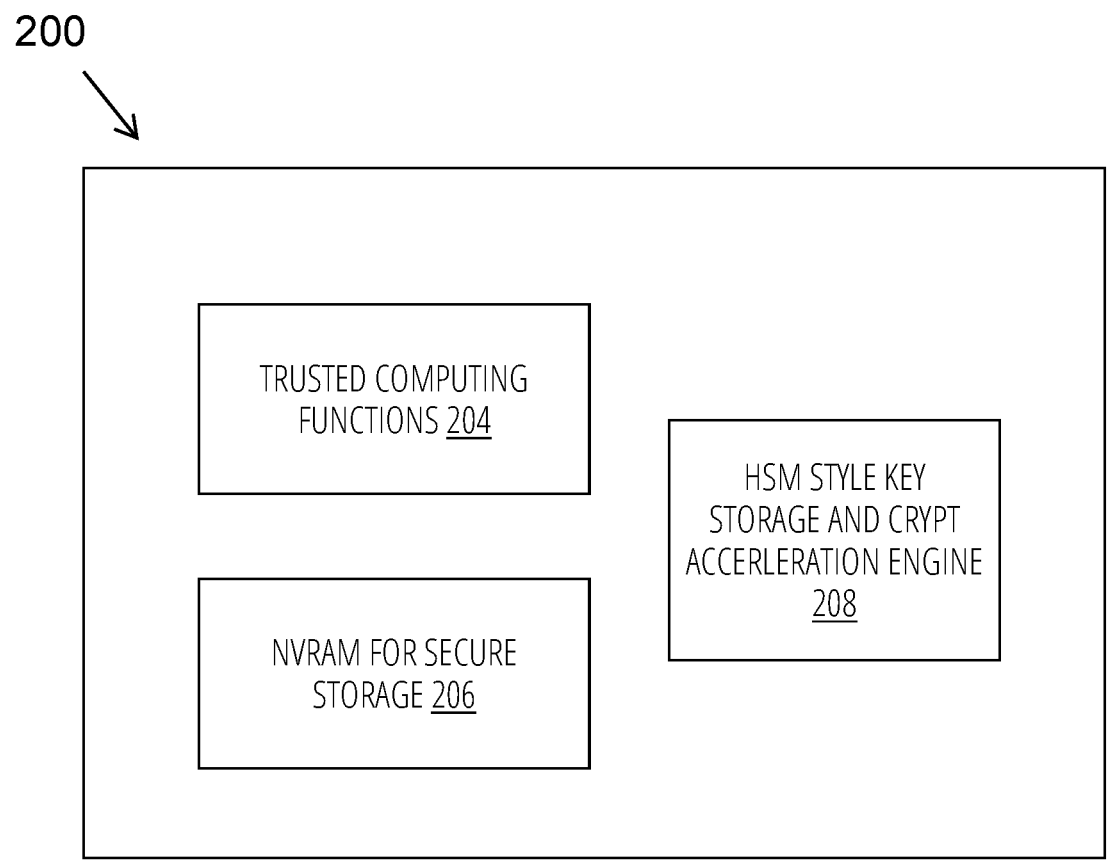
FIG. 2A is an example diagram illustrating functions of a TPM in accordance with some aspects of the present technology.
Figure 2B:
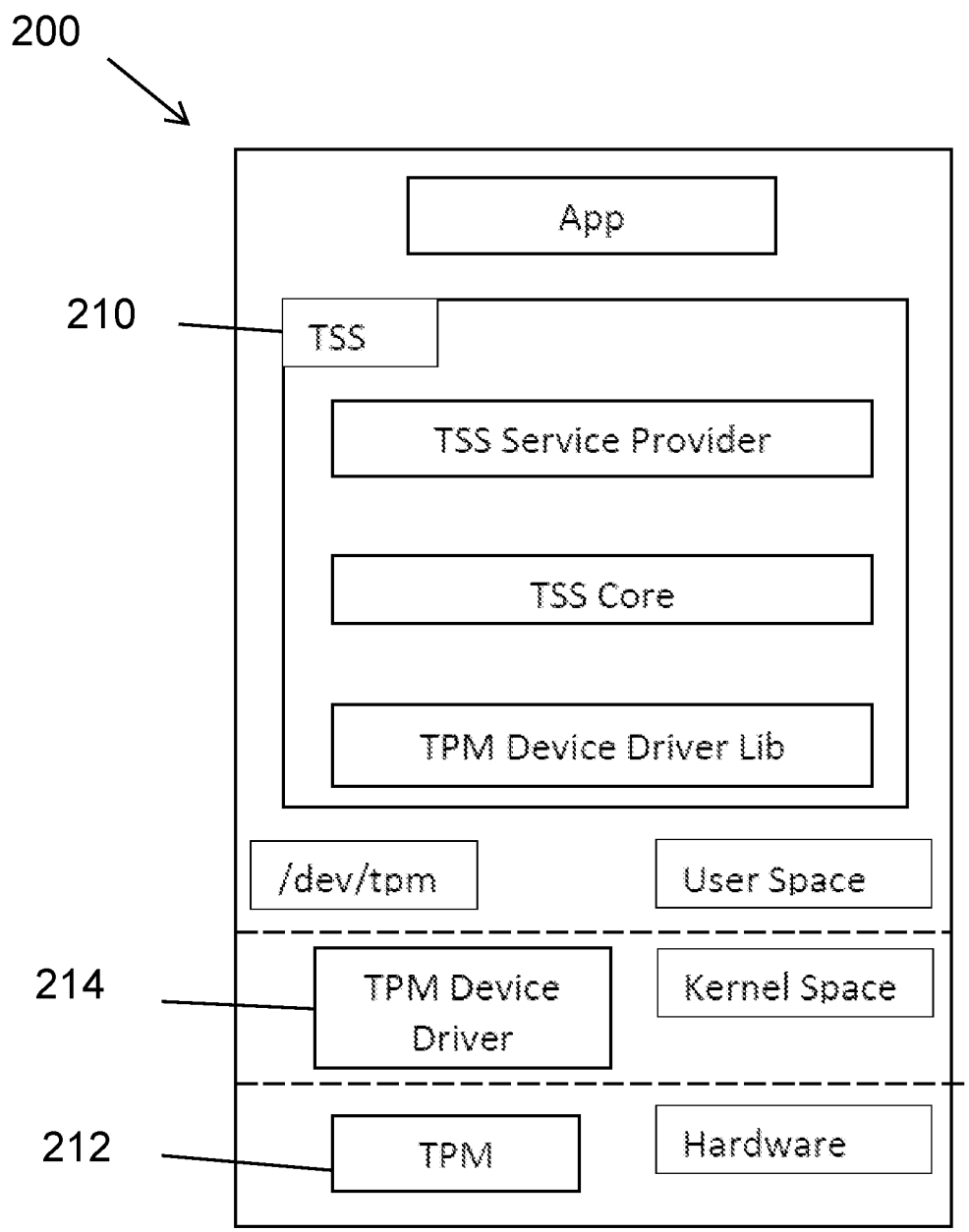
FIG. 2B illustrates an example diagram of the TPM of FIG. 2A in accordance with some aspects of the present technology.
Figure 3:
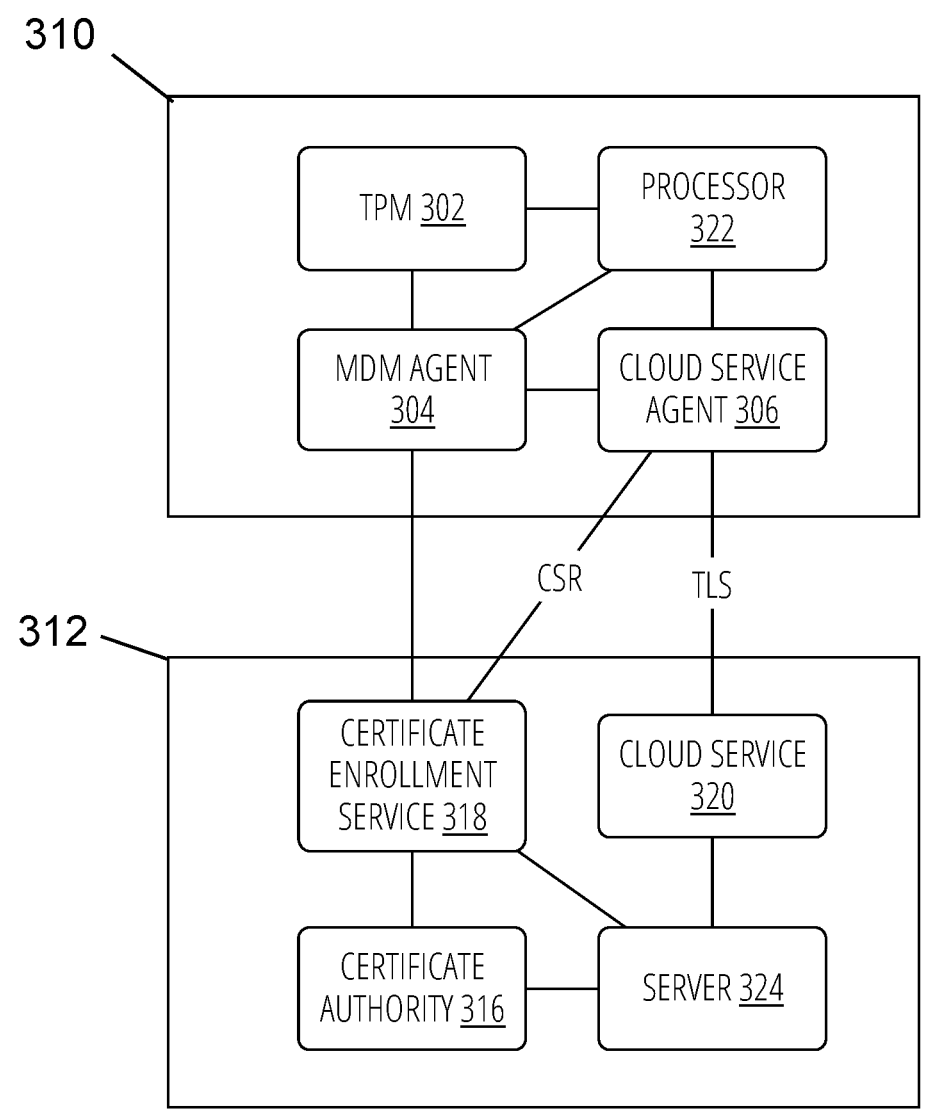
FIG. 3 illustrates a system diagram for establishing trust between a device and a cloud service in accordance with some aspects of the present technology.
Figure 4A:
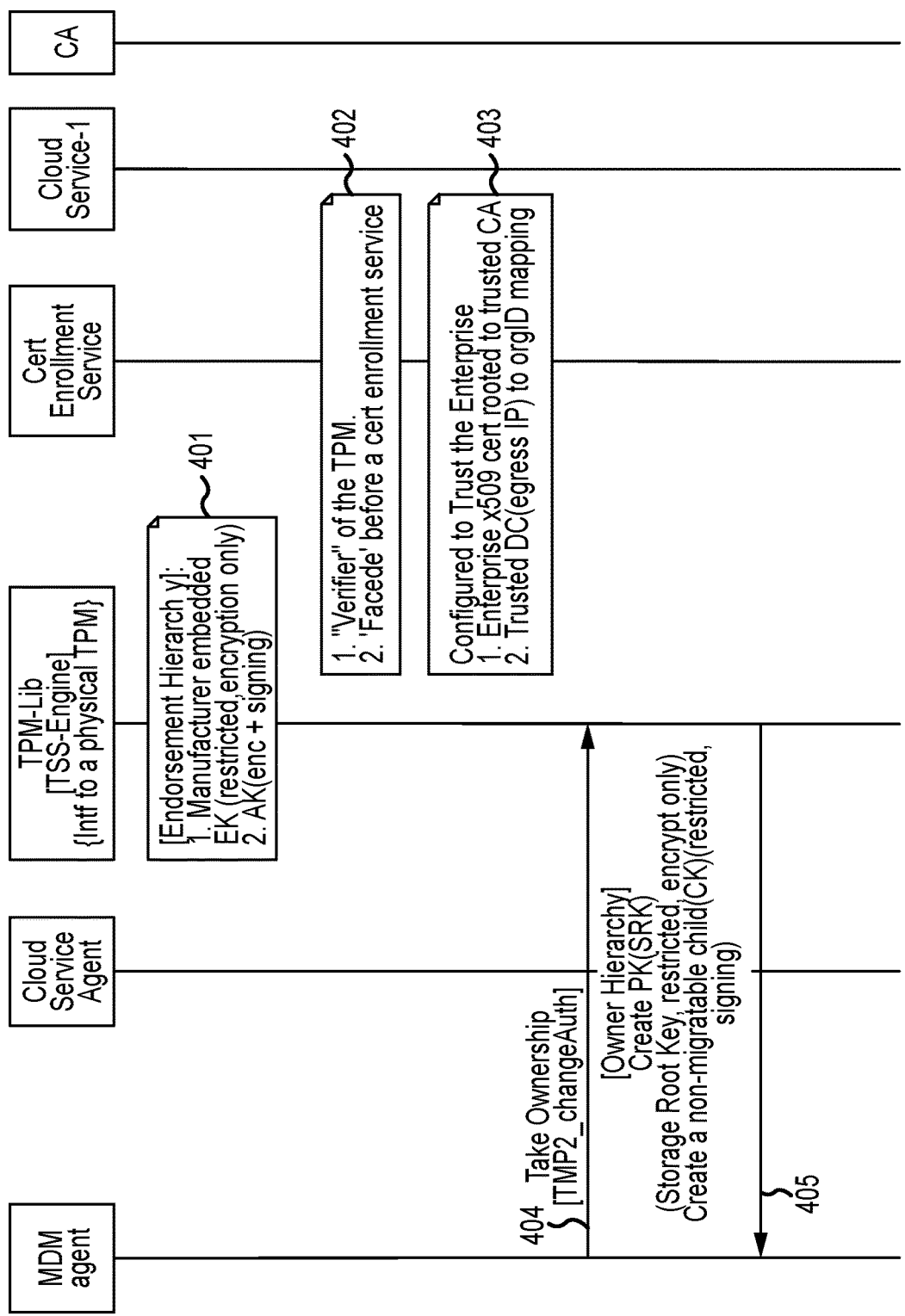
FIG. 4A illustrates a sequence diagram for establishing trust between the device and the cloud service of FIG. 3 in accordance with some aspects of the present technology.
Figure 10:
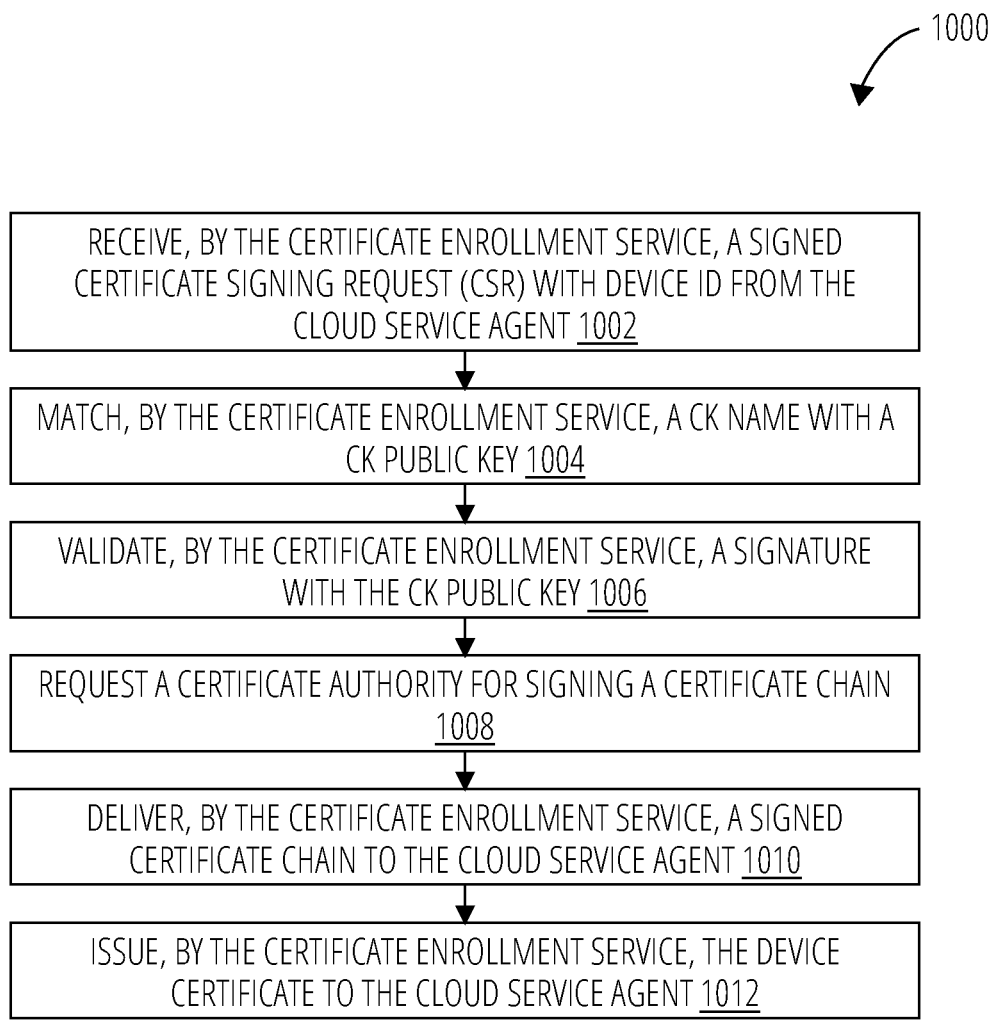
FIG. 10 is a flow chart illustrating the steps for issuing a device certificate in accordance with some aspects of the present technology.
Figure 11:
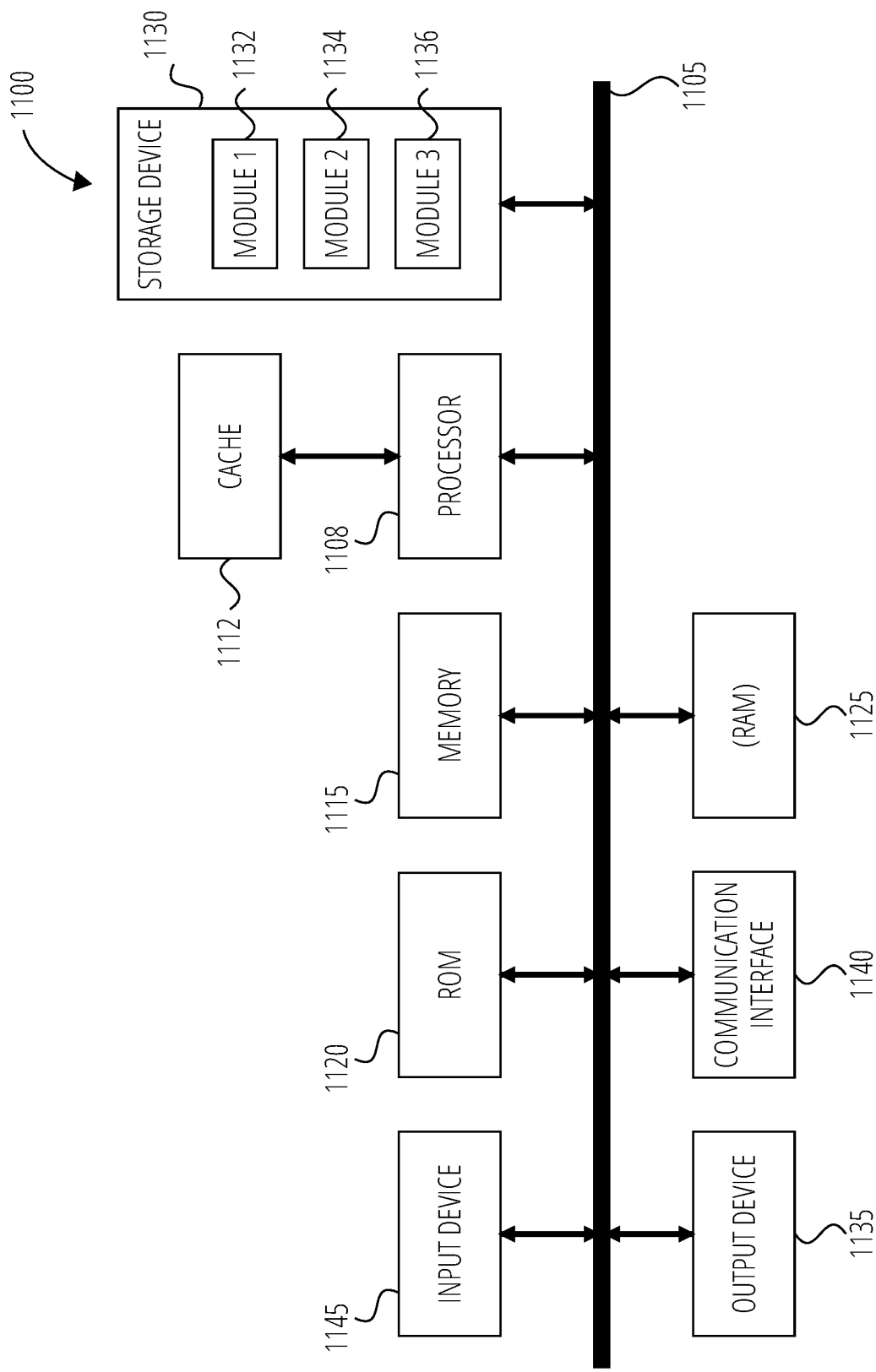
FIG. 11 shows an example of a computing system for implementing certain aspects of the present technology.

A description of example network environments and architectures for network data access and services, as illustrated in FIG. 1 is first disclosed herein. FIGS. 2A-2B illustrates an example diagram of functions of a TPM and an example diagram of the TPM, respectively. FIG. 3 illustrates an example system diagram including all the components involved in an example sequence diagram of the present technology, as shown in FIGS. 4A-4B. FIGS. 5-10 are flow charts illustrating various processes of the present technology. The discussion then concludes with a brief description of example computing devices, as illustrated in FIG. 11.

FIG. 1 illustrates an example cloud computing architecture, according to some aspects of the present disclosure. Cloud computing architecture 100 can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2A illustrates an example diagram illustrating function of a TPM in accordance with some aspects of the present technology. As shown in FIG. 2A, a TPM 200 is a dedicated chip on a motherboard that provides hardware encryption. The TPM 200 is a discrete cryptographic processor attached to a daughter board which plugs into the motherboard. The TPM 200 securely stores cryptographic keys which can be created with encryption software.

The TPM 200 includes trusted computing functions 204, which includes Platform Configuration Register (PCR) for measuring software state. The PCR is a memory location in the TPM. The trusted computing functions 204 also include key scaling function and facilitate secure generation of cryptographic keys. The trusted computing functions 204 also include remote attestation, which creates a hash key summary of a hardware and software configuration. A user may use hashing to verify that the hardware and software configuration have not been changed. The software in charge of hashing can determine the extent of the hash key summary.

The TPM 200 also includes non-volatile memory (NVRAM) 206 for secure storage. TPM device 200 also includes hardware security module (HSM) style key storage and cryptographic acceleration 208.

FIG. 2B illustrates an example diagram of the TPM of FIG. 2A in accordance with some aspects of the present technology. The TPM 200 includes TPM Software Stack (TSS) 210 in user space, which is a software specification that provides a standard application programming interface (API) for accessing the functions of the TPM. The TPM 200 also includes TPM chip 212, which is a hardware. The TPM 200 also includes TPM device driver 214.

Computer programs can use the TPM 200 to authenticate hardware devices, since each TPM chip 212 has a secret EK burned in when the TPM chip 212 is produced. The security embedded in hardware provides more protection than a software-only solution.

FIG. 3 illustrates a system diagram for establishing trust between a device and a cloud service in accordance with some aspects of the present technology. As shown in FIG. 3, a device 310 includes TPM 302, a MDM agent 304, and a cloud service agent 306.

The MDM agent 304 is a network-management software module that resides in the device 310 or a managed device. The MDM agent 304 is a software that allows administrators to monitor and control applications, security policies, among others. The MDM agent 304 provides managements for various cloud services.

The cloud service agent 306 can be an Umbrella roaming security module or AnyConnect module, which provides security on any network. The cloud service agent 306 or roaming security module enforces security at a domain name system (DNS) layer to block malware, phishing, and command and control callbacks over any port.

The device 310 includes a processor 322 in communication with the TPM 302, MDM agent 304, and cloud service agent 306. The device 310 may be a managed device or a network node. Any networked device may function as a managed device. The device 310 may be client endpoints 116 that include any device with networking capabilities.

A cloud 312 includes a certificate enrollment service 318, a cloud service 320 and a certificate authority 316 or CA 316. The cloud 312 also includes a server 324 in communication with the certificate enrollment service 318, the cloud service 320 and the certificate authority 316 or CA 316.

The cloud 312 (e.g., Umbrella cloud) is a cloud security platform that provides an additional line of defense against malicious software and threats on the internet by using threat intelligence. The threat intelligence helps prevent adware, malware, botnets, phishing attacks, and other known bad websites from being accessed.

The device 302, such as managed devices, intends to establish trust with a cloud service 314, such as a multi-tenant cloud service, an Umbrella cloud service, among others. The cloud service 320 is an application and infrastructure resource existing on an Internet. Third-party providers contract with subscribers for these cloud services, allowing customers or users to leverage powerful computing resources without having to purchase or maintain hardware and software. The cloud service 320 may include one or more cloud computing services.

The certificate enrollment service 318 is an active service that enables users and computers to perform certificate enrollment by using the HTTPS protocol and also enables policy-based certificate enrollment when the client computer is not a member of a domain or when a domain member is not connected to the domain. The CA 316 signs CSR if all conditions are satisfied.

The MDM agent 304 takes ownership of the TPM 302 and communicates with certificate enrollment service 312, which can issue a device certificate to the cloud service agent 308. The cloud service agent 306 generates certificate signing request (CSR) and communicates with the certificate enrollment service 318. Then, the cloud service agent 308 has secure communication with cloud service 314 using mTLS.

FIG. 4A illustrates a sequence diagram for establishing trust between the device and the cloud service of FIG. 3 in accordance with some aspects of the present technology.

At operation 401, an endorsement hierarchy is a TPM's manufacturer hierarchy, which is pre-loaded with an endorsement key (EK), an EK certificate, and a certificate chain which has been signed by the manufacturer's trusted certificate authority (CA) and stored at a non-volatile (NV) index. The EK certificate represents the unique identity of the TPM.

The TPM is also loaded with the attestation key (AK), which is derived from the EK. The AK is an anonymous key that is cryptographically related to the EK. The AK resides in the endorsement hierarchy. An access to an AK public key (AK_pub) allows to validate the signature on the quote, and consequently to confirm that a device in question is in a healthy system state.

At operation 402, the certificate enrollment service 318 is configured to be the verifier of the TPM for the cloud service 320. For the cloud service 320 to trust a device, the cloud service 320 needs to verify that the cloud service indeed communicates to a real TPM.

At operation 403, the certificate enrollment service 318 is configured to trust the device 310.

At operation 404, the MDM agent 304 takes ownership of the TPM 302. In other words, the MDM agent 304 can represent the TPM 302 and have the authority of the TPM 302. The MDM agent 304 is an enterprise agent, which communicates with the TPM 302 based on a defined authorization policy.

At operation 405, the MDM agent 304 verifies the existence of the EK in the endorsement hierarchy. The MDM agent 304 creates an owner hierarchy in which hierarchy authorization and key authorization are enabled. The MDM agent 304 creates a storage root key (SRK), which is a primary key in the storage hierarchy. The SRK is asymmetric and encryption-only and stored in NVRAM. The SRK is non-duplicate and fixed.

The MDM agent 304 also creates an asymmetric non-exportable child key (CK) under the encryption only SRK, stores the CK into NVRAM. The CK is subsequently enrolled to an authority. The CK is non-duplicate and fixed.

FIG. 4B illustrates a first continuation of the sequence diagram of FIG. 4A in accordance with some aspects of the present technology.

At operation 406, the MDM agent 304 starts enrollment with the cloud service 320, which is a first step in an enrollment process. The objectives of the enrollment process include (1) establishing trust with the cloud service and (2) creating an enrollment account.

To trust a requesting entity, such as device 310, the MDM agent 304 propagates a signed enterprise signing key with a nonce (i.e., replay protection). The MDM agent 304 also produces evidence to demonstrate that the device 310 has a real TPM. The MDM agent 304 also produces evidence to demonstrate that the cryptographic operations are performed by the TPM 302, and keys (e.g., EK, AK, SRK, and CK) are protected by the TPM 302. The MDM agent 304 also produces evidence to demonstrate that the CK to be enrolled is a TPM resident. The private key cannot escape the TPM.

At this point, the certificate enrollment service 318 creates an enrollment account that is not yet approved or activated. The CK name (CK_Name, which is a hash of the CK_Pub) is stored in the certificate enrollment service 318 for validating the CSR at a later stage.

At operation 407, trust establishment with the TPM includes that the certificate enrollment service 318 (1) validates IP or bearer, (2) starts enrollment, (3) validates the CK name, and (4) starts credential challenge.

The cloud service 320 initiates the flow for making credential and activating credential operations. At operation 408, the certificate enrollment service 318 challenges the device with an encrypted blob, which can result from the making credential operation. The making credential operation includes (1) generating credential blob, (2) generating a secret, (3) wrapping credential blob, (4) generating a seed (seed, EK_Pub), (5) deriving Hash-based message authentication code (HMAC) key (for integrity) and symmetric key (for confidentiality) from a Trusted Computing Group (TCG) specified Key Derivation Function (KDF) (seed, CK_Name), and (6) wrapping the secret with the symmetric key.

At operation 409, the MDM agent 304 starts an authorization session, establishes policy secret for the authorization session, and performs the activating credential operation. The activating credential operation includes (1) decrypting seed with an EK private key (e.g., proof of possession), (2) computing CK_Name and applying the same hashing mechanism used in making credential, (3) using KDF with seed and CK_Name to derive HMAC and symmetric key, and (4) Using symmetric key to unwrap the secret.

At operation 410, the making credential and activating credential operations ensure a proof of possession. The making credential and activating credential operations also ensure that the request comes from a real TPM. The making credential and activating credential operations further ensure that the CK name corresponds to a TPM resident key. Upon successful completion of activating credential operation on the TPM, three facts are established, (1) proof of possession (e.g., EK private key or EK_pvt), (2) the request comes from a real TPM, and (3) CK name corresponds to a TPM resident.

At operation 411, the TPM 302 delivers the secret in a plain text form over Transport Layer Security (TLS) to the MDM agent 304.

At operation 412, the MDM agent 304 responds to the challenge made by the certificate enrollment service 318 with the secret in a plain text form over TLS.

Figure 4C:
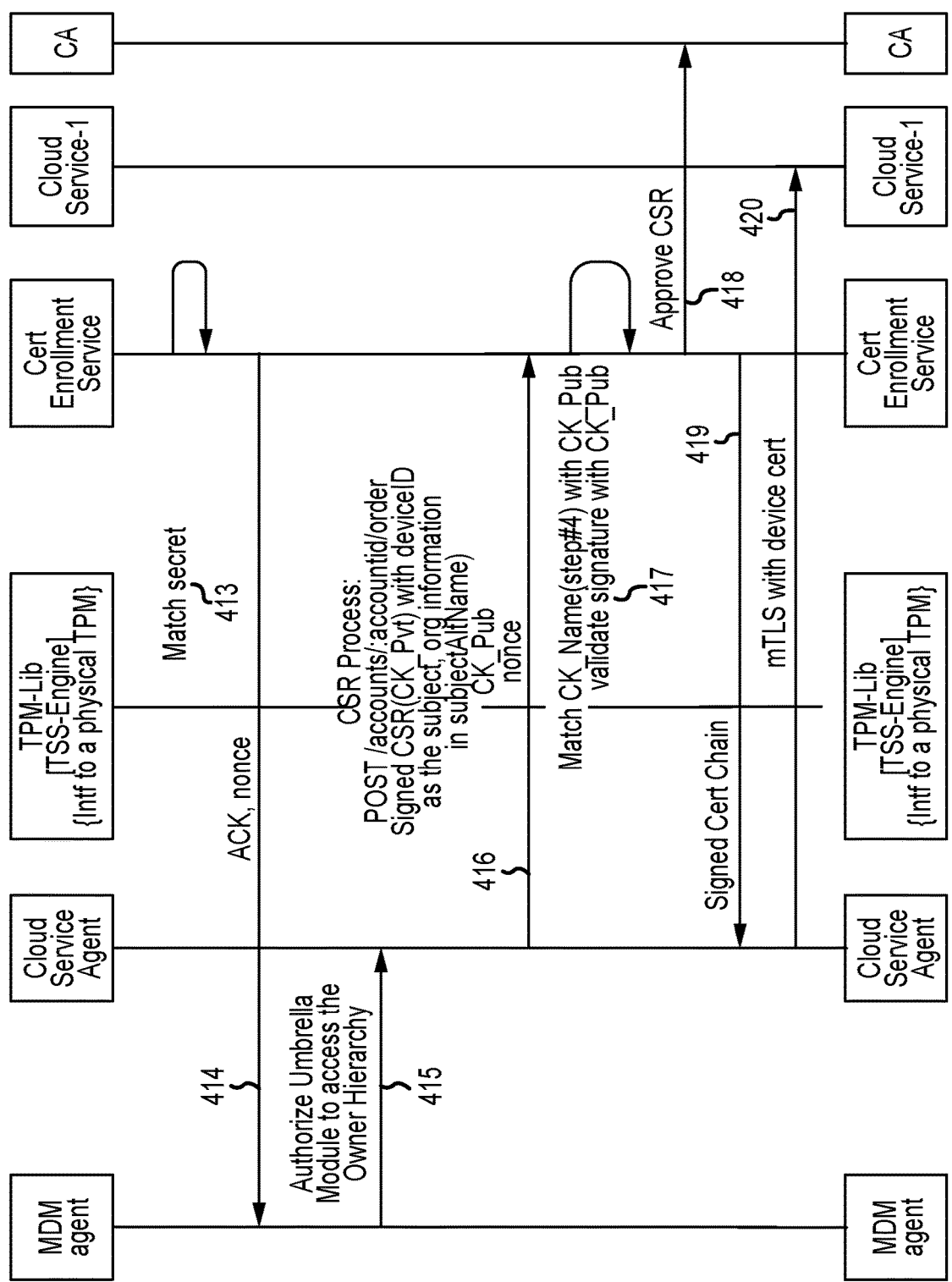
FIG. 4C illustrates a second continuation of the sequence diagram of FIG. 4A following FIG. 4B in accordance with some aspects of the present technology.

FIG. 4C illustrates a second continuation of the sequence diagram of FIG. 4A following FIG. 4B in accordance with some aspects of the present technology.

At operation 413, the certificate enrollment service 318 matches the secret from the MDM agent 304 with the secret from the making credential operation.

At operation 414, upon successful validation of the secret, the certificate enrollment service 318 completes an account initiation process and responds to the MDM agent 304 with an acknowledgement (ACK+nonce) for the next call.

At operation 415, MDM agent 304 delegates control to the cloud service agent 306 to perform subsequent operations.

At operation 416, cloud service agent 306 generates CSR based on CK and signs by using CK private key (CK_pvt) without loading the CK private key in plain text form. The cloud service agent 306 presents the CSR to the enrollment service with CK public key (CK_Pub). The certificate enrollment service 318 has CK name (CK_Name).

At operation 417, the certificate enrollment service 318 matches CK name with the CK public key (CK-pub), and validates the signature with the CK public key. If the CK name is matched and the signature is validated, the certificate enrollment service 318 requests the certificate authority 316 or CA for signing at operation 418. A device certificate is rooted to a trusted CA. The certificate authority 316 issues the device certificate and passes the device certificate to the certificate enrollment service 318, which delivers the device certificate to the cloud service agent 306 of the cloud service 320.

At operation 419, the certificate enrollment service 318 delivers a signed certificate chain and the device certificate to the cloud service agent 306.

At operation 420, for all subsequent communications with the cloud service 320, the device uses mTLS presenting the device certificate obtained from the certificate authority 316. Note that the TPM does not expose the private key during the mTLS.

Figure 5:
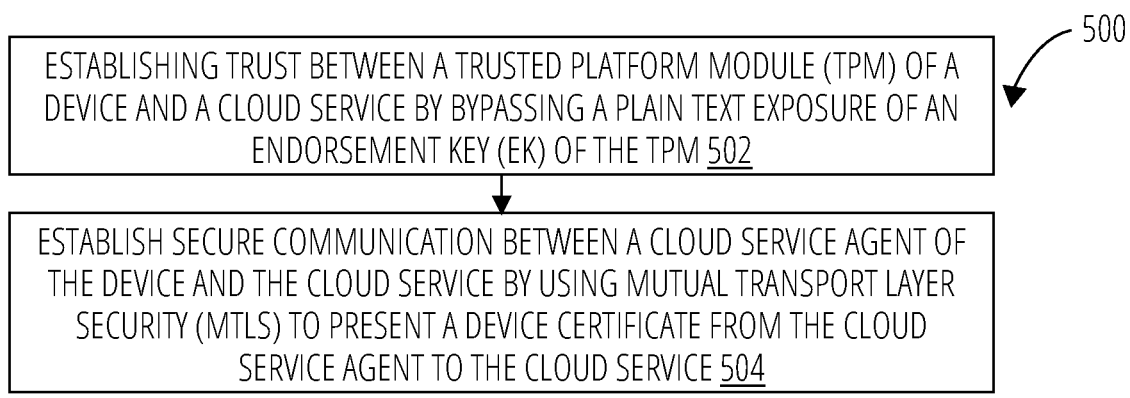
FIG. 5 is a flow chart illustrating the steps for secure enrollment of a device in a cloud service in accordance with some aspects of the present technology.

FIG. 5 is a flow chart illustrating the steps for secure enrollment of a device in a cloud service in accordance with some aspects of the present technology.

At step 502, method 500 includes establishing trust between a trusted platform module (TPM) of a device and a cloud service by bypassing a plain text exposure of an endorsement key (EK) of the TPM. The EK is not downloaded in a plain text form. All cryptographic operations, including signing, encryption, key generation happen inside the TPM. The method has strict authorization to NVRAM contents.

In some aspects, the establishing trust between a TPM of the device and a cloud service includes establishing trust between the MDM agent of the device and a certificate enrollment service for the cloud service.

FIGS. 6-9 illustrate the operations for establishing the trust between a trusted platform module (TPM) of a device and a cloud service by bypassing a plain text exposure of an endorsement key (EK) of the TPM in further details.

At step 504, method 500 includes establishing secure communication between a cloud service agent of the device and the cloud service by using mutual Transport Layer Security (mTLS) to present a device certificate from the cloud service agent to the cloud service. This corresponds to operations 416-420 in FIG. 4C. The steps for issuing the device certificate are illustrated in FIG. 10.

Figure 6:
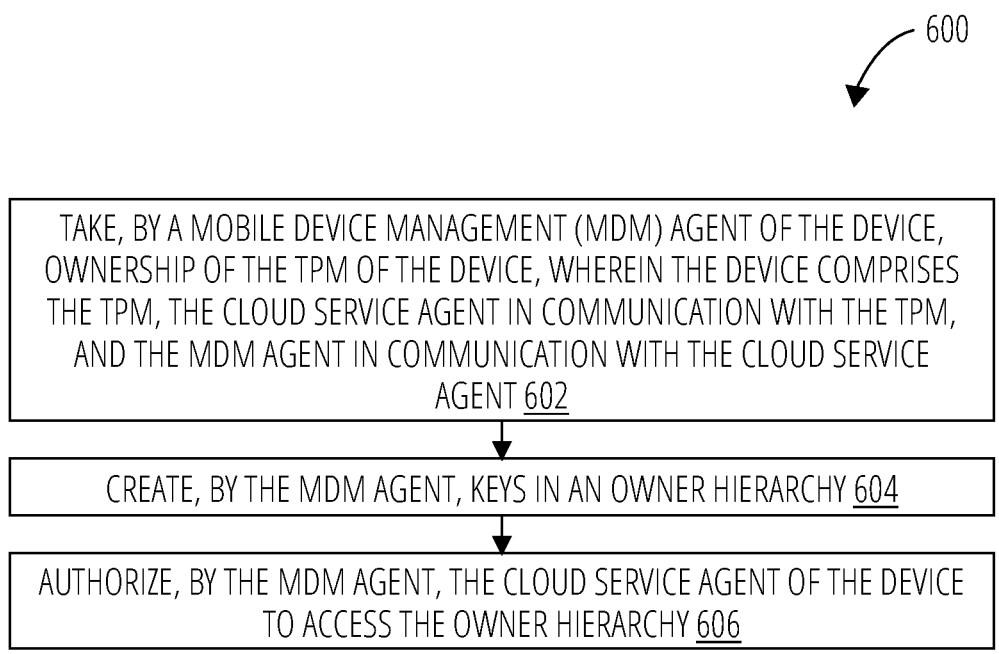
FIG. 6 is a flow chart illustrating the steps for creating keys in an owner hierarchy in accordance with some aspects of the present technology.

FIG. 6 is a flow chart illustrating the steps for creating keys in an owner hierarchy in accordance with some aspects of the present technology.

At step 602, method 600 may include taking, by a mobile device management (MDM) agent of the device, ownership of the TPM of the device, wherein the device comprises the TPM, the cloud service agent in communication with the TPM, and the MDM agent in communication with the cloud service agent. For example, the MDM agent 304 may take ownership of the TPM of the device, which corresponds to operation 404 in FIGS. 4A-4C. The device includes the TPM 302, the cloud service agent 306 in communication with the TPM 302, and the MDM agent 304 in communication with the cloud service agent 306.

At step 604, method 600 may include creating, by the MDM agent, keys in an owner hierarchy. For example, the MDM agent 304 may create keys in an owner hierarchy, which corresponds to operation 405 in FIGS. 4A-4C.

In some aspects, the creating, by the MDM agent, keys in an owner hierarchy further includes creating, by the MDM agent, a public key (PK), and creating, by the MDM agent, an asymmetric non-migratable child key (CK). For example, the MDM agent 304 may create a public key (PK), and may also create an asymmetric non-migratable child key (CK).

At step 606, method 600 may include authorizing, by the MDM agent, the cloud service agent of the device to access the owner hierarchy. For example, the MDM agent 304 may authorize the cloud service agent of the device to access the owner hierarchy, which corresponds to operation 415 in FIGS. 4A-4C.

Figure 7:
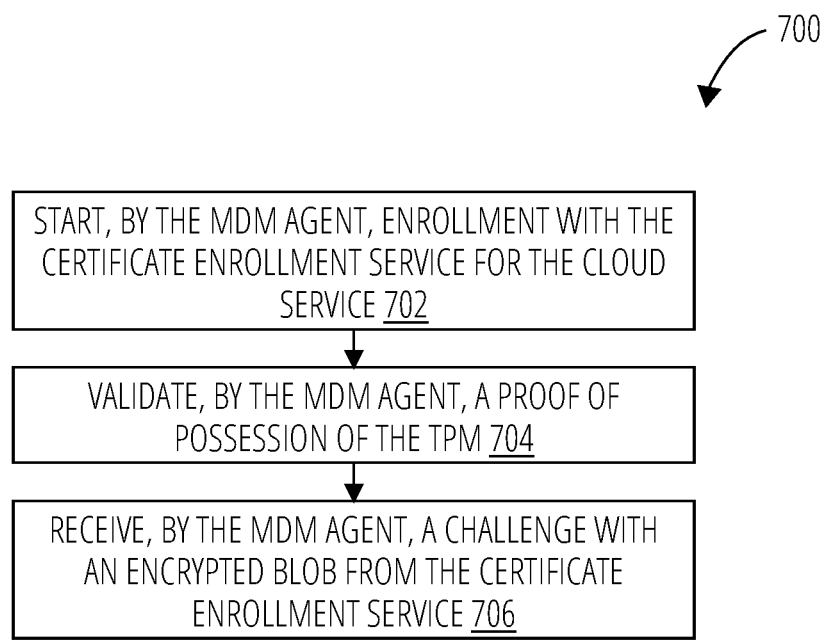
FIG. 7 is a flow chart illustrating the steps for establishing trust between a mobile device management (MDM) agent of a device and a certificate enrollment service for a cloud service in accordance with some aspects of the present technology.

FIG. 7 is a flow chart illustrating the steps for establishing trust between the MDM agent of the device and a certificate enrollment service for the cloud service in accordance with some aspects of the present technology.

At step 702, method 700 may include starting, by the MDM agent, enrollment with the certificate enrollment service for the cloud service. For example, the MDM agent 304 may start enrollment with the certificate enrollment service for the cloud service, which corresponds to operation 406 in FIGS. 4A-4C.

At step 704, method 700 may include validating, by the MDM agent, a proof of possession of the TPM. For example, the MDM agent 304 may validate a proof of possession of the TPM 302.

At step 706, method 700 may include receiving, by the MDM agent, a challenge with an encrypted blob from the certificate enrollment service. The MDM agent 304 may receive a challenge with an encrypted blob from the certificate enrollment service, which corresponds to operation 408 in FIGS. 4A-4C.

Figure 8:
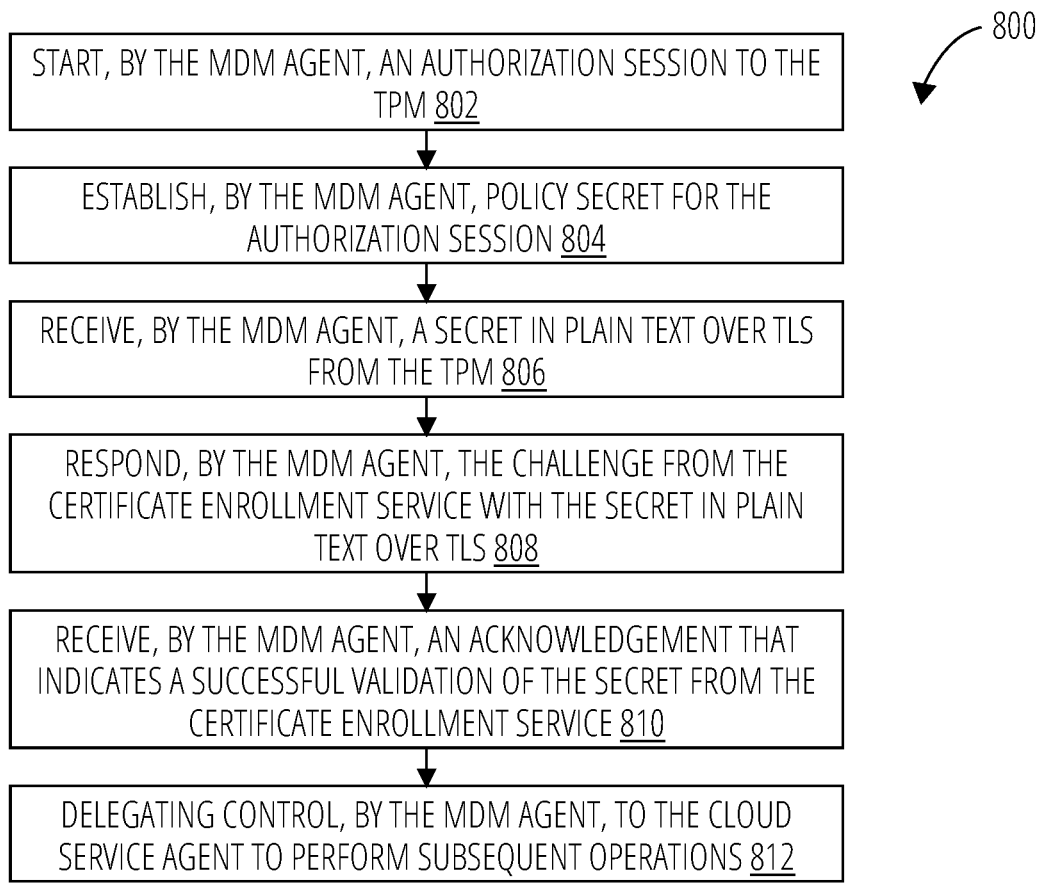
FIG. 8 is a flow chart illustrating the steps for authorizing a cloud service agent of a device to access the owner hierarchy in accordance with some aspects of the present technology.

FIG. 8 is a flow chart illustrating the steps for authorizing the cloud service agent of the device to access the owner hierarchy in accordance with some aspects of the present technology.

At step 802, method 800 may include starting, by the MDM agent, an authorization session to the TPM. For example, the MDM agent 304, may start an authorization session to the TPM, which corresponds to operation 409 in FIGS. 4A-4C.

At step 804, method 800 may include establishing, by the MDM agent, policy secret for the authorization session. For example, the MDM agent 304 may establish policy secret for the authorization session, which corresponds to operation 409 in FIGS. 4A-4C.

At step 806, method 800 may include receiving, by the MDM agent, a secret in plain text over TLS from the TPM. For example, the MDM agent 304 may receive a secret in plain text over TLS from the TPM 302, which corresponds to operation 411 in FIGS. 4A-4C.

At step 808, method 800 may include responding, by the MDM agent, the challenge from the certificate enrollment service with the secret in plain text over TLS. For example, the MDM agent 304 may respond to the challenge from the certificate enrollment service with the secret in plain text over TLS, which corresponds to operation 412 in FIGS. 4A-4C.

In some aspects, method 800 may also include further includes receiving, by the certificate enrollment service, the secret from the MDM agent, and matching, by the certificate enrollment service, the secret to validate the secret, which corresponds to operation 413 in FIGS. 4A-4C.

At step 810, method 800 may include receiving, by the MDM agent, an acknowledgement that indicates a successful validation of the secret from the certificate enrollment service. The MDM agent 304 may receive an acknowledgement that indicates a successful validation of the secret from the certificate enrollment service, which corresponds to operation 414 in FIGS. 4A-4C.

At step 812, method 800 may include delegating control, by the MDM agent, to the cloud service agent to perform subsequent operations. The MDM agent 304 may delegate control to the cloud service agent to perform subsequent operations, which corresponds to operation 415 in FIGS. 4A-4C.

Figure 9:
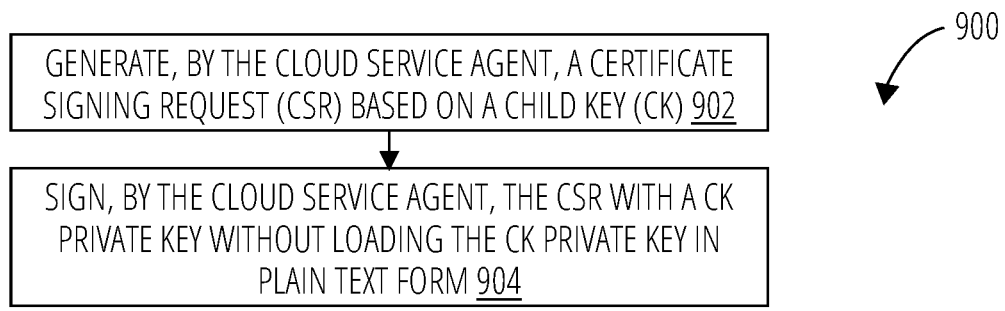
FIG. 9 is a flow chart illustrating the steps for certificate signing request (CSR) process in accordance with some aspects of the present technology.

FIG. 9 is a flow chart illustrating the steps for certificate signing request (CSR) process in accordance with some aspects of the present technology.

At step 902, method 900 may include generating, by the cloud service agent, a certificate signing request (CSR) based on a child key (CK). For example, the cloud service agent 306 may generate a certificate signing request (CSR) based on a child key (CK), which corresponds to operation 416 in FIGS. 4A-4C.

At step 904, method 900 may include signing, by the cloud service agent, the CSR with a CK private key without loading the CK private key in plain text form. For example, the cloud service agent 306 may sign the CSR with a CK private key without loading the CK private key in plain text form, which corresponds to operation 416 in FIGS. 4A-4C.

FIG. 10 is a flow chart illustrating the steps for issuing a device certificate in accordance with some aspects of the present technology.

At step 1002, method 1000 may include receiving, by the certificate enrollment service, a signed certificate signing request (CSR) with device ID from the cloud service agent. For example, the certificate enrollment service 318 may receive a signed certificate signing request (CSR) with device ID from the cloud service agent 306.

At step 1004, method 1000 may include matching, by the certificate enrollment service, a CK name with a CK public key. For example, the certificate enrollment service 318 may match a CK name with a CK public key, which corresponds to operation 417 in FIGS. 4A-4C.

At step 1006, method 1000 may include validating, by the certificate enrollment service, a signature with the CK public key. For example, the 318 may validate a signature with the CK public key, which corresponds to operation 417 in FIGS. 4A-4C.

At step 1008, method 1000 may include requesting, by the certificate enrollment service, a certificate authority for signing a certificate chain. For example, the certificate enrollment service 318 may request a certificate authority for signing a certificate chain, which corresponds to operation 418 in FIGS. 4A-4C.

In some aspects, the requesting a certificate authority for signing a certificate chain further includes receiving, by the certificate authority, a request for signing from the certificate enrollment service, and approving, by the certificate authority, a request for signing the CSR. For example, the certificate authority 316 may receive a request for signing from the certificate enrollment service 318, and may approve a request for signing the CSR, which corresponds to operation 418 in FIGS. 4A-4C. Other technical features may be readily apparent to one skilled in the art from the following figures, descriptions, and claims.

At step 1010, method 1000 may include delivering, by the certificate enrollment service, a signed certificate chain to the cloud service agent. For example, the certificate enrollment service 318 may deliver a signed certificate chain to the cloud service agent, which corresponds to operation 419 in FIGS. 4A-4C.

At step 1012, method 1000 may include issuing, by the certificate enrollment service, the device certificate to the cloud service agent. For example, the certificate enrollment service 318 may issue the device certificate to the cloud service agent.

FIG. 11 shows an example of computing system 1100, which can be, for example any computing device making up the servers 104, the processor 322, the server 324, and other devices described herein, or any component thereof in which the components of the system are in communication with each other using connection 1105. Connection 1105 can be a physical connection via a bus, or a direct connection to processor 1108, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 808 and connection 1105 that couples various system components including memory 1115, such as read-only memory (ROM) 1120 and random-access memory (RAM) 1125 to processor 1108. Computing system 1100 can include a cache of high-speed memory 1112 connected directly with, in close proximity to, or integrated as part of processor 1108.

Processor 1108 can include any general-purpose processor and a hardware service or software service, such as services 1132, 834, and 836 stored in storage device 1130, configured to control processor 1108 as well as a special-purpose processor where software instructions are incorporated into the actual processor design. Processor 1108 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement, and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1130 can include software services, servers, services, etc., that when the code that defines such software is executed by the processor 1108, it causes the system to perform a function. In some embodiments, a hardware service that performs a particular function can include the software component stored in a computer-readable medium in connection with the necessary hardware components, such as processor 1108, connection 1105, output device 1135, etc., to carry out the function.

Clause 1. A method for secure enrollment of a device in a cloud service comprising: establishing trust between a trusted platform module (TPM) of a device and a cloud service by bypassing a plain text exposure of an endorsement key (EK) of the TPM; and establishing secure communication between a cloud service agent of the device and the cloud service by using mutual Transport Layer Security (mTLS) to present a device certificate from the cloud service agent to the cloud service.

Clause 2. The method of clause 1, further comprising: taking, by a mobile device management (MDM) agent of the device, ownership of the TPM of the device, wherein the device comprises the TPM, the cloud service agent in communication with the TPM, and the MDM agent in communication with the cloud service agent; creating, by the MDM agent, keys in an owner hierarchy; and authorizing, by the MDM agent, the cloud service agent of the device to access the owner hierarchy.

Clause 3. The method of clause 2, wherein the creating, by the MDM agent, keys in an owner hierarchy further comprises: creating, by the MDM agent, a public key (PK); and creating, by the MDM agent, an asymmetric non-migratable child key (CK).

Clause 4. The method of clause 2, wherein the establishing trust between a TPM of the device and a cloud service comprises establishing trust between the MDM agent of the device and a certificate enrollment service for the cloud service.

Clause 5. The method of clause 4, wherein the establishing trust between the MDM agent of the device and the certificate enrollment service for the cloud service comprises: starting, by the MDM agent, enrollment with the certificate enrollment service for the cloud service; validating, by the MDM agent, a proof of possession of the TPM; and receiving, by the MDM agent, a challenge with an encrypted blob from the certificate enrollment service.

Clause 6. The method of clause 4, wherein the authorizing, by the MDM agent, the cloud service agent of the device to access the owner hierarchy further comprises: starting, by the MDM agent, an authorization session to the TPM; establishing, by the MDM agent, policy secret for the authorization session; receiving, by the MDM agent, a secret in plain text over TLS from the TPM; responding, by the MDM agent, a challenge from the certificate enrollment service with the secret in plain text over TLS; receiving, by the MDM agent, an acknowledgement that indicates a successful validation of the secret from the certificate enrollment service; and delegating control, by the MDM agent, to the cloud service agent to perform subsequent operations.

Clause 7. The method of clause 6, further comprising: receiving, by the certificate enrollment service, the secret from the MDM agent; and matching, by the certificate enrollment service, the secret to validate the secret.

Clause 8. The method of clause 4, after authorizing the cloud service agent of the device to access the owner hierarchy, the method further comprising: generating, by the cloud service agent, a certificate signing request (CSR) based on a child key (CK); and signing, by the cloud service agent, the CSR with a CK private key without loading the CK private key in plain text form.

Clause 9. The method of clause 8, further comprising: receiving, by the certificate enrollment service, a signed certificate signing request (CSR) with device ID from the cloud service agent; matching, by the certificate enrollment service, a CK name with a CK public key; validating, by the certificate enrollment service, a signature with the CK public key; requesting, by the certificate enrollment service, a certificate authority for signing a certificate chain; delivering, by the certificate enrollment service, a signed certificate chain to the cloud service agent; and issuing, by the certificate enrollment service, the device certificate to the cloud service agent.

Clause 10. The method of clause 9, wherein the requesting a certificate authority for signing a certificate chain further comprises: receiving, by the certificate authority, a request for signing from the certificate enrollment service; and approving, by the certificate authority, a request for signing the CSR.

Clause 11. The method of clause 1, wherein the device certificate for mTLS authorization comprises an X.509 certificate.

Clause 12. A non-transitory computer-readable storage medium, the computer-readable storage medium including instructions that when executed by a computer, cause the computer to: establish trust between a trusted platform module (TPM) of a device and a cloud service by bypassing a plain text exposure of an endorsement key (EK) of the TPM; and establish secure communication between a cloud service agent of the device and the cloud service by using mutual Transport Layer Security (mTLS) to present a device certificate from the cloud service agent to the cloud service.

Clause 13. The non-transitory computer-readable storage medium of clause 12, wherein the instructions further configure the computer to: take, by a mobile device management (MDM) agent of the device, ownership of the TPM of the device, wherein the device comprises the TPM, the cloud service agent in communication with the TPM, and the MDM agent in communication with the cloud service agent; create, by the MDM agent, keys in an owner hierarchy; and authorize, by the MDM agent, the cloud service agent of the device to access the owner hierarchy.

Clause 14. The non-transitory computer-readable storage medium of clause 13, the computer-readable storage medium including instructions that when executed by a computer, cause the computer to: create, by the MDM agent, a public key (PK); and create, by the MDM agent, an asymmetric non-migratable child key (CK).

Clause 15. The non-transitory computer-readable storage medium of clause 13, the computer-readable storage medium including instructions that when executed by a computer, cause the computer to establish trust between the MDM agent of the device and a certificate enrollment service for the cloud service.

Clause 16. The non-transitory computer-readable storage medium of clause 15, wherein the establishing trust between the MDM agent of the device and a certificate enrollment service for the cloud service comprises: start, by the MDM agent, enrollment with the certificate enrollment service for the cloud service; validate, by the MDM agent, a proof of possession of the TPM; and receive, by the MDM agent, a challenge with an encrypted blob from the certificate enrollment service.

Clause 17. The non-transitory computer-readable storage medium of clause 15, the computer-readable storage medium including instructions that when executed by a computer, cause the computer to: start, by the MDM agent, an authorization session to the TPM; establish, by the MDM agent, policy secret for the authorization session; receive, by the MDM agent, a secret in plain text over TLS from the TPM; respond, by the MDM agent, a challenge from the certificate enrollment service with the secret in plain text over TLS; receive, by the MDM agent, an acknowledgement that indicates a successful validation of the secret from the certificate enrollment service; and delegate control, by the MDM agent, to the cloud service agent to perform subsequent operations.

Clause 18. The non-transitory computer-readable storage medium of clause 15, the computer-readable storage medium including instructions that when executed by a computer, cause the computer to: generate, by the cloud service agent, a certificate signing request (CSR) based on a child key (CK); and sign, by the cloud service agent, the CSR with a CK private key without loading the CK private key in plain text form.

Clause 19. The non-transitory computer-readable storage medium of clause 18, wherein the instructions further configure the computer to: receive, by the certificate enrollment service, a signed certificate signing request (CSR) with device ID from the cloud service agent; match, by the certificate enrollment service, a CK name with a CK public key; validate, by the certificate enrollment service, a signature with the CK public key; request, by the certificate enrollment service, a certificate authority for signing a certificate chain; deliver, by the certificate enrollment service, a signed certificate chain to the cloud service agent; and issue, by the certificate enrollment service, the device certificate to the cloud service agent.

Clause 20. A computing apparatus comprising: a processor; and a memory storing instructions that, when executed by the processor, configure the apparatus to: establish trust between a trusted platform module (TPM) of a device and a cloud service by bypassing a plain text exposure of an endorsement key (EK) of the TPM; and establish secure communication between a cloud service agent of the device and the cloud service by using mutual Transport Layer Security (mTLS) to present a device certificate from the cloud service agent to the cloud service.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for secure enrollment of a device in a cloud service comprising:
    establishing trust between a trusted platform module (TPM) of a device and a cloud service by bypassing a plain text exposure of an endorsement key (EK) of the TPM;
    establishing secure communication between a cloud service agent of the device and the cloud service by using mutual Transport Layer Security (mTLS) to present a device certificate from the cloud service agent to the cloud service;
    wherein the establishing trust between the TPM of the device and the cloud service includes:
        creating, by a mobile device management (MDM) agent of the device, keys in an owner hierarchy for accessing the device;
        authorizing, by the MDM agent, the cloud service agent of the device to access the owner hierarchy based on a successful validation of a secret by a certificate enrollment service of the cloud service; and
        delegating, by the MDM agent, control of the device to the cloud service upon authorizing the cloud service agent to access the owner hierarchy.

2. The method of claim 1, further comprising:
    taking, by the MDM agent, ownership of the TPM of the device, wherein the device comprises the TPM, the cloud service agent in communication with the TPM, and the MDM agent in communication with the cloud service agent.

3. The method of claim 2, wherein the creating, by the MDM agent, keys in an owner hierarchy further comprises:
    creating, by the MDM agent, a public key (PK); and
    creating, by the MDM agent, an asymmetric non-migratable child key (CK).

4. The method of claim 2, wherein the establishing trust between a TPM of the device and a cloud service comprises establishing trust between the MDM agent of the device and the certificate enrollment service for the cloud service.

5. The method of claim 4, wherein the establishing trust between the MDM agent of the device and the certificate enrollment service for the cloud service comprises:
    starting, by the MDM agent, enrollment with the certificate enrollment service for the cloud service;
    validating, by the MDM agent, a proof of possession of the TPM; and
    receiving, by the MDM agent, a challenge with an encrypted blob from the certificate enrollment service.

6. The method of claim 4, wherein the authorizing, by the MDM agent, the cloud service agent of the device to access the owner hierarchy further comprises:
    starting, by the MDM agent, an authorization session to the TPM;
    establishing, by the MDM agent, policy secret for the authorization session;
    receiving, by the MDM agent, the secret in plain text over TLS from the TPM;

responding, by the MDM agent, a challenge from the certificate enrollment service with the secret in plain text over TLS; and receiving, by the MDM agent, an acknowledgement that indicates the successful validation of the secret from the certificate enrollment service.

7. The method of claim 6, further comprising:
receiving, by the certificate enrollment service, the secret from the MDM agent; and
matching, by the certificate enrollment service, the secret to validate the secret.

8. The method of claim 4, after authorizing the cloud service agent of the device to access the owner hierarchy, the method further comprising:
generating, by the cloud service agent, a certificate signing request (CSR) based on a child key (CK); and
signing, by the cloud service agent, the CSR with a CK private key without loading the CK private key in plain text form.

9. The method of claim 8, further comprising:
receiving, by the certificate enrollment service, a signed certificate signing request (CSR) with device ID from the cloud service agent;
matching, by the certificate enrollment service, a CK name with a CK public key;
validating, by the certificate enrollment service, a signature with the CK public key;
requesting, by the certificate enrollment service, a certificate authority for signing a certificate chain;
delivering, by the certificate enrollment service, a signed certificate chain to the cloud service agent; and
issuing, by the certificate enrollment service, the device certificate to the cloud service agent.

10. The method of claim 9, wherein the requesting a certificate authority for signing a certificate chain further comprises:
receiving, by the certificate authority, a request for signing from the certificate enrollment service; and
approving, by the certificate authority, a request for signing the CSR.

11. The method of claim 1, wherein the device certificate for mTLS authorization comprises an X.509 certificate.

12. A non-transitory computer-readable storage medium, the computer-readable storage medium including instructions that when executed by a computer, cause the computer to:
establish trust between a trusted platform module (TPM) of a device and a cloud service by bypassing a plain text exposure of an endorsement key (EK) of the TPM;
establish secure communication between a cloud service agent of the device and the cloud service by using mutual Transport Layer Security (mTLS) to present a device certificate from the cloud service agent to the cloud service;
wherein the establishing trust between the TPM of the device and the cloud service includes:
create, by a mobile device management (MDM) agent of the device, keys in an owner hierarchy for accessing the device;
authorize, by the MDM agent, the cloud service agent of the device to access the owner hierarchy based on a successful validation of a secret by a certificate enrollment service of the cloud service; and
delegate, by the MDM agent, control of the device to the cloud service upon authorizing the cloud service agent to access the owner hierarchy.

13. The non-transitory computer-readable storage medium of claim 12, wherein the instructions further configure the computer to:
take, by the MDM agent of the device, ownership of the TPM of the device, wherein the device comprises the TPM, the cloud service agent in communication with the TPM, and the MDM agent in communication with the cloud service agent.

14. The non-transitory computer-readable storage medium of claim 13, the computer-readable storage medium including instructions that when executed by a computer, cause the computer to:
create, by the MDM agent, a public key (PK); and
create, by the MDM agent, an asymmetric non-migratable child key (CK).

15. The non-transitory computer-readable storage medium of claim 13, the computer-readable storage medium including instructions that when executed by a computer, cause the computer to establish trust between the MDM agent of the device and the certificate enrollment service for the cloud service.

16. The non-transitory computer-readable storage medium of claim 15, wherein the establishing trust between the MDM agent of the device and a certificate enrollment service for the cloud service comprises:
start, by the MDM agent, enrollment with the certificate enrollment service for the cloud service;
validate, by the MDM agent, a proof of possession of the TPM; and
receive, by the MDM agent, a challenge with an encrypted blob from the certificate enrollment service.

17. The non-transitory computer-readable storage medium of claim 15, the computer-readable storage medium including instructions that when executed by a computer, cause the computer to:
start, by the MDM agent, an authorization session to the TPM;
establish, by the MDM agent, policy secret for the authorization session;
receive, by the MDM agent, the secret in plain text over TLS from the TPM;
respond, by the MDM agent, a challenge from the certificate enrollment service with the secret in plain text over TLS; and
receive, by the MDM agent, an acknowledgement that indicates the successful validation of the secret from the certificate enrollment service.

18. The non-transitory computer-readable storage medium of claim 15, the computer-readable storage medium including instructions that when executed by a computer, cause the computer to:
generate, by the cloud service agent, a certificate signing request (CSR) based on a child key (CK); and
sign, by the cloud service agent, the CSR with a CK private key without loading the CK private key in plain text form.

19. The non-transitory computer-readable storage medium of claim 18, wherein the instructions further configure the computer to:
receive, by the certificate enrollment service, a signed certificate signing request (CSR) with device ID from the cloud service agent;
match, by the certificate enrollment service, a CK name with a CK public key;
validate, by the certificate enrollment service, a signature with the CK public key;

request, by the certificate enrollment service, a certificate authority for signing a certificate chain;
deliver, by the certificate enrollment service, a signed certificate chain to the cloud service agent; and
issue, by the certificate enrollment service, the device certificate to the cloud service agent.

20. A computing apparatus comprising:

a processor; and a memory storing instructions that, when executed by the processor, configure the apparatus to:

establish trust between a trusted platform module (TPM) of a device and a cloud service by bypassing a plain text exposure of an endorsement key (EK) of the TPM;

establish secure communication between a cloud service agent of the device and the cloud service by using mutual Transport Layer Security (mTLS) to present a device certificate from the cloud service agent to the cloud service;

wherein the establishing trust between the TPM of the device and the cloud service includes:

create, by a mobile device management (MDM) agent of the device, keys in an owner hierarchy for accessing the device;

authorize, by the MDM agent, the cloud service agent of the device to access the owner hierarchy based on a successful validation of a secret by a certificate enrollment service of the cloud service; and delegate, by the MDM agent, control of the device to the cloud service upon authorizing the cloud service agent to access the owner hierarchy.

* * * * *